United States Patent
Kohls et al.

(10) Patent No.: US 7,020,632 B1
(45) Date of Patent: Mar. 28, 2006

(54) TRADING SYSTEM FOR FIXED-VALUE CONTRACTS

(76) Inventors: Lawrence Kohls, 1033 W. Loyola Ave., Chicago, IL (US) 60626; Brian F. Clare, 21805 Pleasant Grove Rd., Marengo, IL (US) 60152

( * ) Notice: Subject to any disclaimer, the term of this patent is extended or adjusted under 35 U.S.C. 154(b) by 0 days.

(21) Appl. No.: 09/228,909

(22) Filed: Jan. 11, 1999

(51) Int. Cl.
*G06F 17/60* (2006.01)

(52) U.S. Cl. .......................................... 705/37; 705/36
(58) Field of Classification Search ............. 705/35–40, 705/42, 43, 14
See application file for complete search history.

(56) References Cited

U.S. PATENT DOCUMENTS

| | | | |
|---|---|---|---|
| 3,573,747 A | | 4/1971 | Adams et al. |
| 4,346,442 A | * | 8/1982 | Musmanno ................. 364/408 |
| 4,376,978 A | * | 3/1983 | Musmanno ................. 364/408 |
| 4,412,287 A | | 10/1983 | Braddock, III |
| 4,597,046 A | * | 6/1986 | Musmanno et al. ........ 364/408 |
| 4,674,044 A | | 6/1987 | Kalmus et al. |
| 4,677,552 A | | 6/1987 | Sibley, Jr. |
| 4,774,663 A | * | 9/1988 | Musmanno et al. ........ 364/408 |
| 4,903,201 A | | 2/1990 | Wagner |

(Continued)

FOREIGN PATENT DOCUMENTS

| | | | |
|---|---|---|---|
| EP | 0 491 455 A2 | * | 8/1997 |
| GB | 2294141 A | | 4/1996 |
| GB | 2294788 A | | 5/1996 |
| WO | WO 93/15467 | * | 8/1993 |
| WO | WO 95/23383 A1 | | 8/1995 |
| WO | WO 96/18160 | * | 6/1996 |
| WO | WO /9722071 | * | 6/1997 |
| WO | WO 97/30407 | * | 8/1997 |
| WO | WO 98/04991 A1 | | 2/1998 |

OTHER PUBLICATIONS

Green, et al. "Algorithms for filtering of market price data", Proceedings of the IEEE/IAFE 1997 Computational Intelligence for Financial Engineering (CIFEr), Dialog file 2, Accession No. 5644635.*

Kulkosky, Victor; Making connections in off–exchange trading; Wall street & Technology, v11; n5; p14, Oct. 1993.*

Hoffman, Thomas; Acquisition brings' net–based trading nearer; Computerworld, Oct. 1993.*

Paula Dwyer,, "The 21st Century Stock Market" Business Week, Aug. 10, 1998 at pp. 66–72.

(Continued)

*Primary Examiner*—Frantzy Poinvil
(74) *Attorney, Agent, or Firm*—Philip Koenig

(57) ABSTRACT

A trading system for the trading of fixed-value contracts employs a novel form of contract that has a fixed face value and two sides that respectively represent mutually exclusive outcomes. Traders submit bids specifying a selected "side" of the contract, a price, and a contract quantity specification, for matching with complementary bids submitted for the opposing "side" of the contract, thereupon occasioning "filled" trades. Upon the termination of the contract in accordance with pre-established criteria, resulting in the determination of a prevailing side of the contract, holders of filled contracts whose bid specified the prevailing "side" of the contract receive the face value of the contract. The trading system of the invention is preferably implemented In computerized embodiments that enable traders to submit bids to a host computer over a network, and said host computer provides traders with access to all pertinent trading information in real time, automatically matches complementary bids, and enables the immediate clearing and settlement of all filled trades from deposit accounts established by traders using the system.

26 Claims, 3 Drawing Sheets

U.S. PATENT DOCUMENTS

| | | | |
|---|---|---|---|
| 5,136,501 A | | 8/1992 | Silverman et al. |
| 5,220,501 A | * | 6/1993 | Lawlor et al. ............... 364/408 |
| 5,262,942 A | * | 11/1993 | Earle .......................... 364/408 |
| 5,375,055 A | * | 12/1994 | Togler et al. ............... 364/408 |
| 5,715,402 A | | 2/1998 | Popolo |
| 5,727,165 A | | 3/1998 | Ordish et al. |
| 5,794,207 A | | 8/1998 | Walker et al. |
| 5,794,219 A | | 8/1998 | Brown |
| 5,809,483 A | | 9/1998 | Broka et al. |
| 5,832,462 A | * | 11/1998 | Midorikawa et al. ......... 705/35 |
| 5,870,724 A | * | 2/1999 | Lawlor et al. ................. 705/42 |
| 6,016,483 A | * | 1/2000 | Rickard et al. ............... 705/37 |

OTHER PUBLICATIONS

Stanley W. Angrist, "Iowa Market Takes Stock of Presidential Candidates,"Wall St. Journal Aug. 25, 1995.

Iowa Electronic Markets "Prospectus" Re 1990 Iowa and Illinois Senate Races—1990 (From www.biz.uiona.edu/iem).

Iowa Electronic Markets "Prospectus" Re 1992 Presidential Election—1992 (frow www.biz.uiowa.edu/iem).

Iowa Electronic Markets "Prospectus" Re Trading Event Concerning Microsoft Stock—1995—(from ww.biz.uiowa.edu/iem).

* cited by examiner

TRADING SYSTEM FOR FIXED-VALUE CONTRACTS

FIELD OF THE INVENTION

The present invention relates to trading systems and in particular to a trader-driven system for trading in a novel form of fixed-value contract. The system of the invention comprises a central host computer that is linked by a network such as the internet to a plurality of remote client terminals, such as personal computers, operated by traders who subscribe to the system. The system of the invention enables individual traders to participate in virtual trading pits, wherein each trader may submit to the host computer bids of varying lot sizes and prices with respect to either "side" of a fixed value contract, such as may be established for any occurrence capable of being framed, for purposes of trading, as a Yes/No or For/Against proposition. The system compares bids submitted by traders on one side of any such contract against bids submitted on the opposing side of the same contract, and, upon the occurrence of complementary bids, the system automatically executes a trade. By utilizing pre-established accounts funded by the subscribing traders, for example by credit card, wire transfer or check deposit, the system automatically and immediately performs all clearing and accounting processes needed to complete, guarantee and confirm each trade.

BACKGROUND OF THE INVENTION

The current open outcry method of trading contracts has remained virtually unchanged since its inception over 150 years ago. Open outcry trading exchanges provide a facility in which a limited number of individuals may submit bids and offers on a particular commodity contract, and thereby serve to establish its market value or price. The ability of an open outcry market to discover prices for contracts on future delivery of commodities, and to transfer those contracts between selected traders, has made it a valuable tool for controlling risk and speculation.

An important purpose and effect of commodity markets is to spread the risk of changing prices from a small group to a larger group, a process known as risk management. Speculators enter the market, and thereby provide liquidity for the contracts traded, when changing conditions suggest an economic benefit. As prices fluctuate, the trading of these contracts provides opportunities for profit to the astute trader. The larger the number of traders exchanging contracts, the more liquid the market is, and the greater the opportunity to spread risk of adverse price moves to other traders.

The existing system of open outcry commodity markets is, however, subject to endemic problems and shortcomings, which in the aggregate prevent individual traders from exercising well-informed control over their own activities in the trading process.

Typically each trading exchange and its members control access to the trading pits, and establish a variety of constraining procedures, including the setting of specific hours of operation, trading protocols including trading minimums, and selection of trading instruments. Confusing contract specifications and values, and complicated contract expiration dates, have the practical effect of limiting trading to the comparatively few who have the considerable time and money needed to master complexities of the trading system. Among those familiar with the trading system, those with the opportunity to stand in the actual trading pits, who are known as "floor traders" or "locals", hold a commanding advantage over the ordinary retail trader who is several layers removed from the trading floor.

More generally, the current system of open outcry commodities markets is driven by the restrictive control that members of particular exchanges hold over access to the trading pits, and over the administrative aspects of the trading process, importantly including the procedures employed to confirm and clear trades, and to resolve disputes that arise. In the current system, exchange employees, and the brokerage firms that funnel bids to the exchanges, add many layers of human activity, and thus potential human error, between the originating retail trader and the final resolution of any trade. The advent of computers has not appreciably ameliorated these shortcomings, and all commodity trading systems in commercial use today, including so-called electronic or screen trading systems, continue to require the intermediation of a broker, telephone operator or facilitator between the individual retail trader and the trading floor, and continue to hamper direct trader access to current trading information available to floor traders who are physically located in the trading pits.

The current open outcry system of commodity markets also suffers from structural problems that derive from its origins, when these markets served a small number of participants in a localized area. As the number of traders has increased manifold, the use of large numbers of intermediaries, including brokers, "specialists", market makers and clerks, has become necessary to the operation of the system, and the trading advantages of the floor traders or "locals" physically located on the trading floor have become considerable. In particular the interpolation of several layers of brokers and clerks separating the ordinary retail trader from the trading pit, and from other ordinary retail traders, results in substantial delays in the transmission of current trading information to retail traders and delays in the transmission of their trade orders. These delays in turn have the adverse consequences that retail traders often submit trading instructions on the basis of outdated trading information, and then submit trading instructions that are outpaced by shifts in trading prices before such instructions even reach the trading pit. The structural constraints of current trading systems also severely limit the type and number of commodity contracts that may be traded, as only commodities sanctioned by the exchange may be traded. The current system is accordingly incapable of handling in a fair and equitable manner the number of traders, and the number and types of contracts, potentially capable of being served.

The current commodity exchange systems are also fraught with opportunities for human error, abuse, and even fraud. Trades are not confirmed until the exchange has closed, in a multi-step process known as "clearing." Trades made In the trading pit by floor traders are initially recorded by handwritten notes on paper cards, and the possibility of a mismatched transaction, or "out trade," exists with every trade; as a result each trade needs to be physically confirmed, by a matching of handwritten trade records, as a part of the clearing process. This dearing process in turn requires the manual keypunching of transaction data by exchange employees into computers, again providing opportunities for human error. At best, those traders who have neutralized or offset their position during the trading day, and as a result may have realized net profits, will be unable to access their funds until the following day, assuming all of their trades have cleared properly. In the event of disputes resulting from one or more out trades, the retail trader must await, and abide by, the resolution of the dispute by exchange traders, typically without any input or participation by the affected retail traders. In current trading systems the details of the trading process, and the details of ongoing trading activity in the trading pits, are thus obscured from the ordinary retail trader, and in effect the trading exchange serves preferentially the interests of its members to the detriment of the ordinary retail trader.

Regarding abusive practices, the current system provides no protection against floor traders who exceed the limits of their allowed account balances, or against a floor trader's misuse of rapidly changing trading information to favor or disfavor a retail customer not on the trading floor. For example, in the conventional exchange system floor traders are under no obligation to fill orders In the order In which they were received, and they may discriminate for or against particular retail traders in the filling of bids without any possibility of detection by a disadvantaged trader. Current measures to control illegal or abusive trading practices are limited, and they are inadequate to police the trading process. As a result the individual trader is left without the assurance of a fair and level trading platform.

It is accordingly desirable for a contract trading system to be designed that would enable ordinary retail traders to trade in all currently available contracts without any reliance on intermediaries such as brokers, floor traders and other exchange employees, and to trade in security, anonymously and preferably with immediate confirmation and clearing of all trades, free of the disputes currently caused by out trades. It is also desirable for a trading system to be designed that provides each trader with equal, immediate access to all pertinent trading information. Such pertinent trading information may include current bid prices, bid volume, market depth and concentration, historical price action (including time and sales), and graphically displayed price tick data. It is highly desirable, in short, to replace existing contract trading systems, the detailed operations of which are obscured from ordinary retail traders, with a trading system that operates in a manner characterized by complete transparency for all traders.

In view of the wide availability of inexpensive personal computers, and of worldwide data communications networks such as the internet that are readily accessible to such personal computers, it is desirable to design a contract trading system that harnesses the communications and data processing power of such personal computers and data communications networks, to enable ordinary retail traders to engage freely in trading on a worldwide basis, free of the trading times and other restrictions imposed by the current exchanges, and to do so without resort to special hardware or expensive proprietary software.

There is a accordingly a need for a trading system that eliminates the disadvantages and shortcomings of the existing open outcry contract trading systems and exchanges. Specifically there is a need for a contract trading exchange that allows individual retail traders to trade for their own account directly, without the intermediation of any broker or of trading exchange floor traders or other employees. There is a need for such a trading system in the operation of which all trades are immediately confirmed, cleared and settled, and the funds allocable to traders by virtue of their profitable trades are made immediately available to such traders.

There is also a need for a marketplace in which Individual traders may proffer proposed contracts and create an array of active markets in such proposed contracts without requiring the approval of any trading exchange personnel or controlling body.

The applicant is unaware of the existence of any contract trading exchange which contains any of the above features and that addresses successfully the shortcomings of the prior art trading exchanges as described above.

It is therefore an object of the present invention to provide a trader-driven trading system, for the trading of contracts, that is fair, equitable and transparent, and that enables individual traders to trade directly (yet anonymously) with other individual traders, in real time and without any involvement whatsoever by any broker or any trading exchange personnel.

It is a related object of the present invention to provide a trading system in which all participating traders are provided simultaneously with up to date trading information (importantly including a list of all current active bids, induding price and quantity information, and the last price paid) on precisely the same basis, thereby eliminating the inherent unfairness and the potential for abuse of trading systems in which certain traders have greater or faster access to pertinent trading information than do other traders.

It is a further object of the present invention to provide a trading system whereby all trades are immediately confirmed, cleared and/or settled, and any funds due any trader by virtue of any closed trades are immediately made available to the trader.

It is another important object of the present invention to provide a system and a method for trading that employs, as a trading instrument, a novel form of contract that has a fixed face value and is formatted as a two-sided proposition which represents mutually exclusive outcomes. The form of said contracts is such that any trader may submit a bid on either side of the contract, to be matched with a complementary bid submitted on the opposing side of the contract, thereby qualifying to obtain the fixed face value of said contract in the event the "side" selected by the trader prevails over the opposing side, in accordance with preset contract termination criteria.

It is a related object of the invention to provide a bid matching system, for use in a system for the trading of contract trading instruments having two opposing and complementary "sides", whereby bids are time-stamped on receipt and each incoming bid is compared against a stored list of active bids earlier submitted for the opposite side of said contract, and matches with complementary bids are made in the order of receipt of any said complementary bids.

It is another object of the invention to provide a means for traders who hold a "long" position, with respect to a contract traded on the trading system, to offset and "null" their long position at will, and thereby to conclusively and immediately determine and realize a gain or loss with respect to their trading on said contract, and avoid further risk. (Traders are said to hold a "long" position when their trading activity has resulted in their holding a number of matched or "filled" contracts on one "side" of a contract that exceeds their filled contracts, if any, on the other side of the same contract.) Under the system of the present invention, traders holding a long position on either side of a contract may instantly null their position, in an active market, simply by submitting offsetting bids on the opposite side of said contract, at the best prices then available to obtain the number of contract units or lots needed to null the long position.

It an object of the present invention, ancillary to the preceding object, to provide a system that, upon the occurrence of any trade that returns a trader to a null position, immediately credits or debits that trader's account with the gain or loss realized by the nulling of his or her position.

It is a further object of the present invention to provide a trading system in which bids may be acted upon immediately upon their submission to the trading exchange, and in which active bids may be cancelled instantly at any time following their submission and prior to their acceptance in any effectuated trade.

It is a further object of the present invention to provide a computerized embodiment of such a trading system in which all trading activity may be conducted electronically over a wide area network such as the internet or over a local area network, preferably using suitable cryptological means to insure secure and authenticated communications. It is therefore also an object of the present invention to provide a contract trading system that may readily be adapted for use in intranets operated in closed venues such as lounges, casinos, cruise ships, passenger aircraft cabins and the like.

It is another object of the present Invention to provide such computerized trading system that offers subscribers the capability to submits bids for immediate dissemination to all other system subscribers, and that is capable of immediately matching any such bids with any previously submitted complementary bid, or with any subsequently submitted, complementary opposing bid.

It is another object of the present invention to provide a computerized trading system comprising for each subscriber an account, funded by the subscriber, in which all pertinent Individual trading account data are stored and are automatically updated upon the occurrence of any account-affecting event, Including immediately upon any bid submission, bid cancellation or bid matching. It is a related object of the invention to provide means whereby a reserve is established from a trader's account to cover any bid made by the trader, thereby enabling trades to be automatically effectuated, confirmed, and settled immediately upon the matching of said bid submitted by the trader with an opposing, complementary bid submitted either earlier or later than said bid.

It is one object of the present invention to provide a trading system that is particularly suited for trading in contract positions during the course of a short-lived current event, such as a sporting event, which is susceptible to wide swings of opinion and risk on a minute by minute basis. It is a related object of the trading system of the present invention, wherein all trading decisions made within the system are controlled exclusively by individual traders, to provide a system for trading with respect to events verifiable by outside means, such as sporting events televised concurrently with the trading activity, that is impervious to manipulation or abuse by the operator of the system.

It is another object of the present invention to provide a contract trading system that is accessible to any retail trader having an internet connection capable of interactive graphical data communications. Accordingly the present invention provides means for each trader, upon each connection to an internet site of the trading system, to download the software needed to use the trading system, in the form of a self-launching, richly featured applet Such an applet would thus comprise a graphical user interface (GUI) that enables the trader to receive and display trading information, means to input identification information and trading instructions, including bids and bid cancellations, in a secure manner, and means for enabling the trader to obtain continual updates of trading information from the system host computer.

It is another object of the present invention to enable trading systems that may be addressed by traders operating all manner of data input and output devices, including without limitation so-called "thin clients" or "network computers", personal digital assistants (such as the 3Com "Palm Pilot, but also including two-pay alpha-numeric pagers and cellular telephones having similar capabilities), as well as television monitors, touch screens, kiosk displays, keypads and voice command recognition devices and/or generation devices, whether currently existing or subsequently developed.

It is a still further object of the present invention to provide a contract trading exchange such that any subscribing trader may at any time proffer a new contract for trading on said exchange, and initiate a trading pit or market in such new contract, simply by publishing the desired trading proposition, in the form provided, and submitting a bid on one "side" thereof.

It is another object of the present invention to provide a parlor game in which players, having been provided with a beginning fund account, compete to maximize the profitability of their trading skills, for example as applied to an ongoing televised sporting event, or to game situations created specifically for a trading game. For this and related applications the software needed to operate the parlor game trading system may be stored on any suitable medium, such as game cards for use on popular computer game systems, or in a form downloadable from an internet site, and may be adapted to enable trading commands to be input by a plurality of players via a single or a plural input devices including keyboards, joysticks, voice commands or any other suitable means of inputting data and commands.

Ancillary to the preceding object, it is an object of the present invention to enable embodiments whereby the objects of trading are fictitious or "virtual" events, effectively gaming "games", the flow and outcome of which may be controlled by appropriate programmed criteria to optimize gaming interest and reward gaming skills.

In addition to making possible new trading exchanges, the present invention also makes possible new and highly efficient opinion polling systems, in which both the positions of poll participants and the intensity and depth of their opinions may be evaluated on a continuous and ongoing basis in a manner and with a degree of accuracy and efficiency not provided by existing polling systems.

It Is therefore a further object of the present invention to provide an opinion polling system whereby any individual having access to the trading system may participate in polls on any matter of opinion that may be stated as a two-sided proposition having a defined termination criteria.

These and other objects of the invention will be apparent to those skilled in the art from the following detailed description of the invention, the accompanying drawings and the appended claims.

SUMMARY OF THE INVENTION

The trading system of the present invention comprises a fundamentally new system and method for the trading of interests concerning uncertain events. The system and method of the invention are particularly suited for implementation in computerized systems, which enable many advantages with respect to the elimination of intermediary personnel, the elimination of errors and opportunities for abuse, and otherwise. However the fundamental structure of the trading system of the invention inherently creates important benefits for traders, including greater ease of trading and the reduction of trading risks, that do not depend upon the computerization of the system.

In all presently known trading systems, the object of trading activity (say, corn prices) has an uncertain and variable future value and the specific instruments used to effect trades in such a commodity themselves have an uncertain and an unbounded future value. For example, an offer to sell 5,000 bushels of corm for delivery on Jul. 1, 1999, at a price of $3.00 per bushel, if accepted at that price, results in a binding contract; the eventual value of other similar contracts, however, may vary greatly prior to the delivery date, and may reach low or high values beyond the contemplation of any trader. In sharp contrast the system of the present invention limits the range of values of all trading instruments to a known and predicatable range.

The trading system of the present invention comprises and employs a novel form of contract that has two opposing and complementary "sides" and a fixed face value for each tradable unit of the contract, for example $100, whereby upon the occurrence of a future event having an uncertain outcome there will necessarily be a prevailing side and a losing side, and each holder of a contract unit purchased for the prevailing side collects the fixed value of the contract. The perceived degrees of uncertainty of the posited outcomes then determines the current market price of each "side" of such a fixed value contract, necessarily at a value between zero and the face value of the contract.

The purchase of contracts by traders occurs exclusively upon the occurrence of a "match" between a bid placed on one side of the contract, specifying a set number of contract units and a bid price, and a second, complementary bid submitted by a trader on the opposing side of the contract. An opposing bid is deemed complementary, and thus triggers a match, when (and only when) it specifies a bid price that, added to the price specified in the first bid, equals or exceeds the fixed value of the contract unit. Where an opposing bid is submitted at a complementary price, but for a different number of contract units, a match is preferably still declared, and is effectuated for the lesser of the two numbers of units specified by the two traders, resulting in "filled" contracts for each trader for said lesser number of contracts and a new open bid for the contract units remaining unfilled.

Preferably, traders are required to support their bids by the reserve or withdrawal of funds in personal trader accounts maintained by the system. The contract structure and bid matching system of the present invention then operate to ensure that funds will always be immediately available in the system to satisfy the successful bids of all prevailing contract holders.

The object of trading activity in a system according to the present invention may be any event having an uncertain future outcome, where such outcome can be presented, for purposes of trading within the system of the invention, in the form of two opposing outcomes. In a setting in which a multitude of traders trade actively on a trading event, the system of the present invention enables traders to enter into numerous trades in the course of the trading event, which may run for hours or days in the case of a sports event, and months or years for other trading objects such as elections.

In particular the system of the present invention provides ready means for traders to hedge their trades, by submitting bids on the two sides of the contract substantially simultaneously, at prices selected to limit the range of any losses. Examples draw from the sports world, such as "Reds win" or "Blues win" in the case of a hockey Stanley Cup championship game, provide useful illustrations. Trader A might for example submit a bid for 5 contracts at $44.50 each for Blues to win and, a moment later, a bid for 8 contracts on Reds to win, at $53.25 each. If other bidders then (or later, as prices fluctuate) proceed to match 5 of these opposing contracts with complementary bids of their own, Trader A would hold 5 filled contracts on each side of the game, and thus a "null" position, and he would have earned $11.25 (less commissions) from these transactions: Whoever wins the contest, trader A is guaranteed to receive $500 as the holder of 5 contracts on the prevailing team, while having paid a total of $488.75 to purchase the 10 contracts ($44.50×5=$222.50 and $53.25×5=$266.25, totaling $488.75). Assuming a commission to the system of $0.50 per filled contract, trader A will have netted $6.25 from his trading activity to that point, and the game may yet be days away. In this example, trader A still has outstanding bids to purchase 3 contracts on Red to win, at a bid price of $53.25, but the trader is able to cancel these "open bids" at any time prior to the occurrence of any further matches, and to submit or not submit additional bids, on either side of the contract.

The distinguishing characteristics of the novel trading system of the present invention therefore comprise (a) a trading proposition whereby the uncertain outcome of a trading object is framed as the opposition of two and only two possible outcomes, (b) trading instruments available for purchase by traders and framed to represent said two possible outcomes, said trading instruments having a single fixed value, payable at the conclusion of the trading event to the holders of contracts that posit the prevailing outcome of the trading object, and (c) the condition that a binding "filled" trade is declared when and only when the prices bid for two opposing trading instruments are in the aggregate equal or greater than the fixed value of said trading instruments.

On completion of the contract event and the determination of its outcome, therefore, each unit of each contract on the prevailing "side" has a value equal to the preset fixed value (say $100 per contract in the above example), which amount is immediately payable by the trading system to holders of these contracts, and is accordingly credited by said operator to the accounts of said holders. Conversely the value of all contracts held on the "losing" "side" of the contract is then zero. At all times earlier in the life of the contract, the market price of each side of the contract will necessarily fluctuate between these two endpoints, $0.00 and $100, depending on traders' perception of the relative uncertainties of the two possible outcomes.

The use in the present invention, as the trading instrument, of a contract that has a fixed face value, and is proffered to bidders who each may take either of two opposing "sides" or positions concerning the contract, provides to traders many important advantages that are not found in any known trading systems: One such advantage is that the system and method of the invention greatly simplify the bid matching process, by allowing traders, any traders, to set prices on both sides of the contract solely by bidding. Traditional trading methods rely on the matching of specific offers to sell contracts (i.e., sellers' offers) with bids to buy those specific contracts (i.e., buyers' offers). In contrast, in the system of the present invention, a contract match will result whenever the combined amount of two opposing bids equals the preset fixed contract value. The need for offers to sell, as the initiating element in trading, is thereby eliminated, making the process of holding a position on either side of the contract truly symmetrical.

It is also an important advantage of the system of the present invention that it eliminates short selling (a difficult concept for many traders to comprehend, let alone practice), because overall risk is known at all times, readily understood, and readily managed from the outset. "Short selling" occurs when a trader sells contracts or stock, today, at a price that the trader speculates is higher than he will have to pay to repurchase those same instruments In the future. For example a trader may sell contracts on corn for delivery in December for $2.50 a bushel, in the belief and expectation that the future price will be substantially lower and will enable a net profit on the transaction. However unexpected events, such as weather or supply and demand forces, may cause a dramatic rise in future corn prices. The trader has no way of ascertaining, with any certainty, the maximum risk to which the "short" sale has exposed him or her. That risk is therefore potentially unlimited.

Most trading by the public in any commodity or financial instrument is done on the "long" side, because the trader can better know and manage the risk of the trade than when trading "short". In "playing the long side" traders limit their risk to their initial investment, while their potential profit is theoretically limitless. As explained above, a trader who takes a "short" position does exactly the opposite: He or she limits potential gain to the original investment while incurring the risk of a potential loss that is theoretically limitless.

In the trading system of the present invention, the market price of any contract traded on the system, and therefore the risk assumed by every trader, is at all times strictly bounded between two fixed endpoints ($0.00 and $100.00 in our examples); the market price of the contract, at any point in time, is "discovered" by the matching of opposite bid values that always remain within these fixed bounds, that is, the market price is discovered by the receipt of complementary bids on opposing sides of the contract. It is therefore a major benefit of this trading system and method that the possibility of an unbounded risk is wholly precluded: each trader knows, at each moment, the maximum risk entailed by his or her trading position, resulting in the elimination of any potential open-ended loss. In the bid/bid technique of the trading system of the present invention, each trader's risk Is defined and limited at the moment each bid is made. In effect, therefore, only "long" positions are taken. In that sense the making of trades in the system of the invention resembles the purchase of option contracts, in that the maximum loss on any given trade is limited to the amount paid or bid for the contract.

Furthermore the system of the present invention, which allows each trader to bid either side of the contract at any time, provides ready means for any trader to neutralize a long position, lock In a profit or limit a loss, immediately and at any time, simply by bidding the other side of a contract. A trader who is, say, "long 8 contracts" on "Red wins", in the Stanley Cup example, may instantly "null" that "long" position by submitting and matching one or more bids to purchase 8 contracts on the opposing side, "Blues win", at prices selected to match currently open bids on the "Reds win" side. Upon the execution of this order, the financial outcome of the trader's trading activity, to that point, regarding the contract in question will have been conclusively determined; the system may then immediately credit or debit the trader's account, as appropriate, with the net gain or loss resulting from that trading activity, notwithstanding the incompleteness of the trading event.

The trading system of the present invention, comprising a novel contract structure and a trading method wherein all trades concern units of a contract having two opposing and complementary sides, and a fixed value equal for all contract units, as described above, may generally be implemented with or without the assistance of electronic means of communications. Indeed the invention may for example be implemented manually, for example employing a physical trading pit comprising blackboards and paper records for the entry of bids, lists of open bids, filled contracts, account balances, and other trading data.

A computerized embodiment of the invention is necessary, however, to obtain and exploit fully the many benefits and advantages enabled by the present invention. Using communications networks such as the internet, any number of traders may simultaneously connect to the computerized system from any location in the world, thereby enabling real time trading by retail traders with no access to traditional trading pits. Computerized embodiments also provide the advantages of trading free of all human interference or time-of-day constraints, with instant and equal access to all pertinent trading information, and the instant and error-free execution, clearing and settlement of all trades. Other trading systems according to the invention may readily be designed by persons skilled in the pertinent computer arts to operate over a variety of intranet communications systems. In view of these advantages of computerized embodiments of the invention, the following description of the invention and of a preferred embodiment thereof will be limited to computerized embodiments.

Computerized embodiments of the invention may be operated in a manner that is completely trader-driven, with no broker, floor trader, or any other human intermediary standing between the retail trader and the trading pit created by the system. Such a system provides the retail trader with complete control of each trade, and protection against making an inadvertent or unintended trade. In the preferred embodiment described below, all traders connecting to the system are actually operating in the trading pit simultaneously, and each trader enters bids directly into the trading pit, simply by placing bid orders from his or her personal computer. All trades are thus initiated, and executed, by the individual retail trader for his or her own account, by entering bids of varying lot sizes and prices on their own personal computers, and transmitting bid order data to a Host computer for processing. Furthermore each trader who has an open bid outstanding in the pit may cancel that bid at any time prior to a match, virtually instantaneously upon observing a shift in market conditions that renders the cancellation of the bid desirable to the trader.

In its computerized embodiments the system of the invention comprises a central computer, the Host computer, that Is linked by conventional telecommunications channels to the "client" terminals of subscribers, which client terminals may be conventional personal computers. The Host comp uter comprises databases that maintain dynamically updated databases of all pertinent trading information, including lists of all bids received by the system, for each available taraing pit, including for each bid a series of attributes including price, quantity, time-stamp of receipt, sender identification, and status (for example "open", "cancelled" or "filled"); other Host databases contain subscriber identification and authentication information, and dynamically updated trader account information. The Host computer further comprises suitable software to implement the bid matching procedures described herein, and to execute, clear and settle all trades, as well as appropriate means to man age trader accounts and provide necessary s ecurity to all transactions.

The computerized implementation currently considered by the applicant to be the best mode of practicing the invention is set forth below, but it will be readily apparent to persons of skill in the computer arts that the development of software means suitable to implement a trading system according to the invention, based solely on the narrative description set forth above, is well within the skill of competent software engineers.

In the operation of a computerized embodiment of the invention, the Host computer transmits to each subscriber's terminal, In real time, detailed information regarding one or (preferably) a plurality of virtual trading pits, each limited to trading in lots of a single, fixed-value contract having two opposing "sides" or positions.

Traders connect to the system electronically via the internet or any other suitable telecommunications network, and assemble into electronic trading pits, in which all participating traders share access equally to all information available regarding the current price of the contracts then offered in said pits, and all traders are able to act on that information instantly, with one button ease, thereby constituting a new contract trading system. All software required by traders to participate fully In the trading system of the present invention may readily be downloaded to each trader by the Host computer upon the trader's log-on to an internet site of the trading system, by means of a conventional applet, and consequently the only application software needed on the trader's terminal is an ordinary World Wide Web browser, such as the currently available Microsoft Explorer or Netscape Navigator browser software.

All of the information required by the individual trader to evaluate potential trades, and to ascertain current prices and market activity, is made simultaneously available at the Host computer, at all times and in real time, to all system subscribers to the precisely same extent, thereby avoiding the potential for abuse that exists in current markets by reason of the disproportionate access to information controlled by the floor traders. The instantaneous availability of this real time market data provides each individual trader with opportunities for rapid reaction to market movements that are unmatched by any known conventional trading exchange. A wealth of historical trading data, and trading volume data may also readily be made available to connecting traders to enable their gauging of market depth and concentration. In general, no outside markets or data need to be accessed for trades to be initiated or completed.

The Host computer performs all of the administrative functions ordinarily performed by a conventional trading exchange, but, importantly, neither the Host computer nor (more generally) the system operator have any influence on any contract price movements, beyond receiving bid orders from traders, and performing bid handling and matching calculations, and providing current trading information to all participating traders. It is solely the "marketplace" system of connected traders enabled by the present invention that controls price movements, and the proprietor or operator of the trading system cannot set any prices, other than those arrived at by the traders themselves, or manipulate any time-stamp data. The control of the Host computer is preferably limited to establishing the trading protocols, and to providing the account administration and security services described herein, thereby providing a secure and efficient trading platform that insures the immediate clearing and settlement of all contracts in the system.

At the outset of each trading session, "client" software is preferably transmitted to each subscribing trader by the Host computer in the form of a feature-rich applet. This client software enables the trader to display "graphical user interface" (GUI) screens on a conventional monitor, which GUI screens the user may navigate using a conventional pointer such a computer mouse, and thereby access a selection of trading pits, trading information, and the trader's own account information. Utilizing various function buttons displayed on these GUI screens, traders may accordingly submit dynamically written queries to data tables maintained by the Host computer, and may view their account balances, net positions, profit and loss, and every open, filled or cancelled trade, including time-stamp information.

Following the trader's selection of a trading pit, and the transmission of that selection to the Host, the Host transmits to the trader's terminal by way of the compiled applet a display of that trading pit, including current trading data and selection buttons that allow the trader to submit a bid for either side of the contract traded in the selected pit. Importantly the trading data thus transmitted to the trader includes lists of open bids submitted on each side of the contract, including for each open bid its price and the number of contracts specified. Any trader wanting to trade may then submit one or more bids, on either or both of the two opposing sides of the contract, specifying for each bid a bid price and a lot number. Preferably the client software at the trader's own terminal will require the trader to confirm the entry of each bid, for example with the entry of a personal pin number, before the client software will transmit that bid order to the Host computer.

Upon receipt of a bid order by the Host computer the Host immediately compares the new bid against a table of stored bids that Identifies open bids, and checks for any complementary opposing bids. That is, the Host checks for any open bid for the opposing side of the contract which specifies a price that, added to the price of the new bid, would match or exceed the set value of the pertinent contract. f, after checking the preset value of the contract, the Host determines that one or more opposing bids specifying such a reciprocal price to the price of the new bid are listed in the open bid database, i.e., that this database contains "matching bids", the Host initiates a contract match. The Host then checks any matching bids for Ume-stamp information and automatically assigns a match between the new bid and the reciprocal bid having the earliest time-stamp. This procedure eliminates the potential for unfair abuse that exists in conventional trading pit exchanges, where no control exists over the discretion of floor traders to fill orders in a manner other than In the order in which they were received by the floor trader.

The Host computer checks trader account balances and limits during every transaction, it sets up a reserve against each new bid immediately upon receiving it and entering it into the bid table, and generally it updates each trader's account information and balances upon the occurrence of any action affecting the traders account. As a result the Host computer will not effectuate any trade that would result in any traders account being overdrawn. The system of the invention thus eliminates major sources of errors and abuses in traditional exchange trading and assures complete order tracking, at all times.

After account balance checks by the Host, indicating the satisfaction of all contract conditions, the Host notifies the two matched traders of the entry of a filled contract, and passes the contract information to the account of each trader. The reserves earlier withheld by the Host from each trader's account, upon the submission of their respective bids, are now applied immediately to clear and to settle the trade. Commissions are charged at this time by the Host to the account of each matched trader according to preset terms (which may for example include variances for various membership levels), and the accounts of the matched traders are instantaneously debited and/or credited according to the relative positions In their individual accounts. All data pertinent to the trade is recorded by the Host, and position and account information updated to reflect their trade is made available to the traders both immediately and subsequently for the tracking of any transaction and the resolution of any dispute. This immediate availability of accurate information regarding each completed trade, and immediate clearing, settlement and accounting for each completed trade, are features of the present invention that contrast sharply with the operation of conventonal trading exchanges, where, at best, accounts and balances are updated in the course of overnight manual operations that are fraught with opportunities for error.

DESCRIPTION OF PREFERRED EMBODIMENT

The trading system of the present invention is preferably implemented in computerized embodiments that comprise a Host computer in communication via a telecommunications network with client terminals operated by traders who subscribe to the trading system. Trader access to the trading system is preferably provided by way of a set of graphical user interface (GUI) screens, preferably encoded in a client software package that is transmitted to the trader by the Host computer, via an applet, as described below. The graphical screens provided by the client software for display on the monitor of the trader's computer may readily be designed to include a wealth of trading information and also manipulation buttons for the use of the trader in the bidding process, and in accessing personal account information; these screens and all functions and links displayed thereon may be navigated by the user by means of conventional pointing devices such as a mouse. Connection by traders to the Host computer managing the trading system may be made using any suitable network interconnection means such as TCP/IP protocols over a Wide Area Network (WAN) such as the internet, a Local Area Network (LAN), or any other type of network intercommunication means that supports interactive data transmission.

Figure 1:
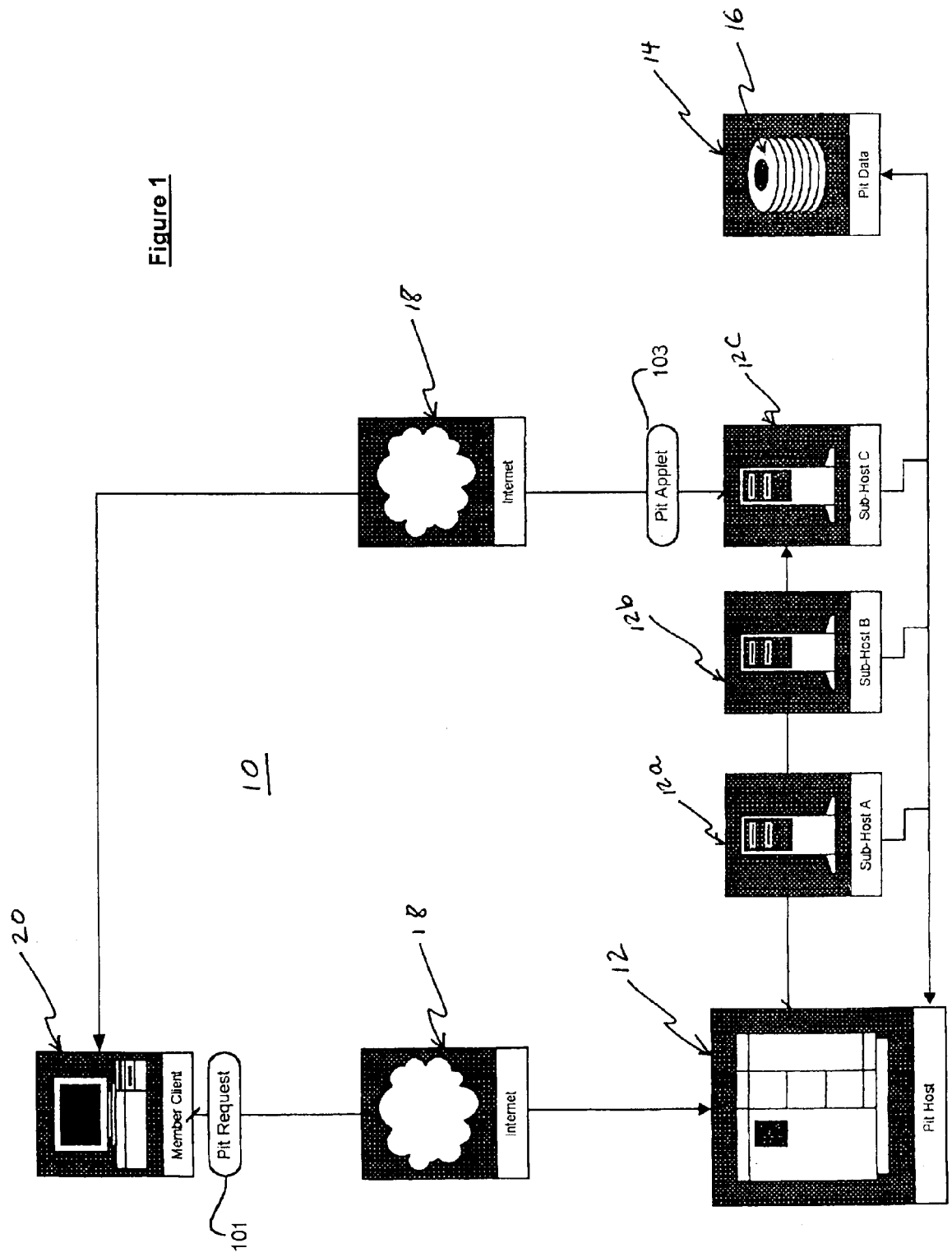
FIG. 1 is a block diagram illustrating the general configuration of a computer network trading system according to the present invention.
Figure 2:
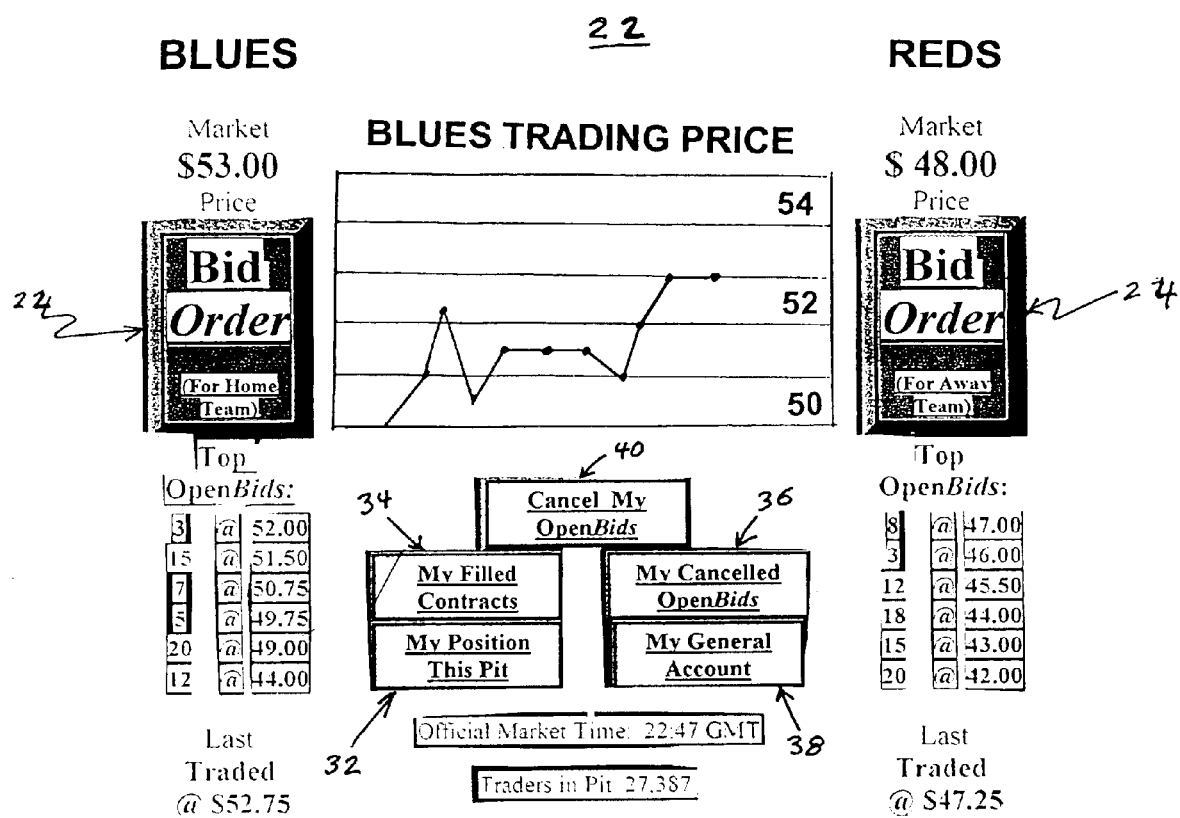
FIG. 2 is a sample form of a trading pit screen for display on the remote computer of a trader according to the present invention.
Figure 3:
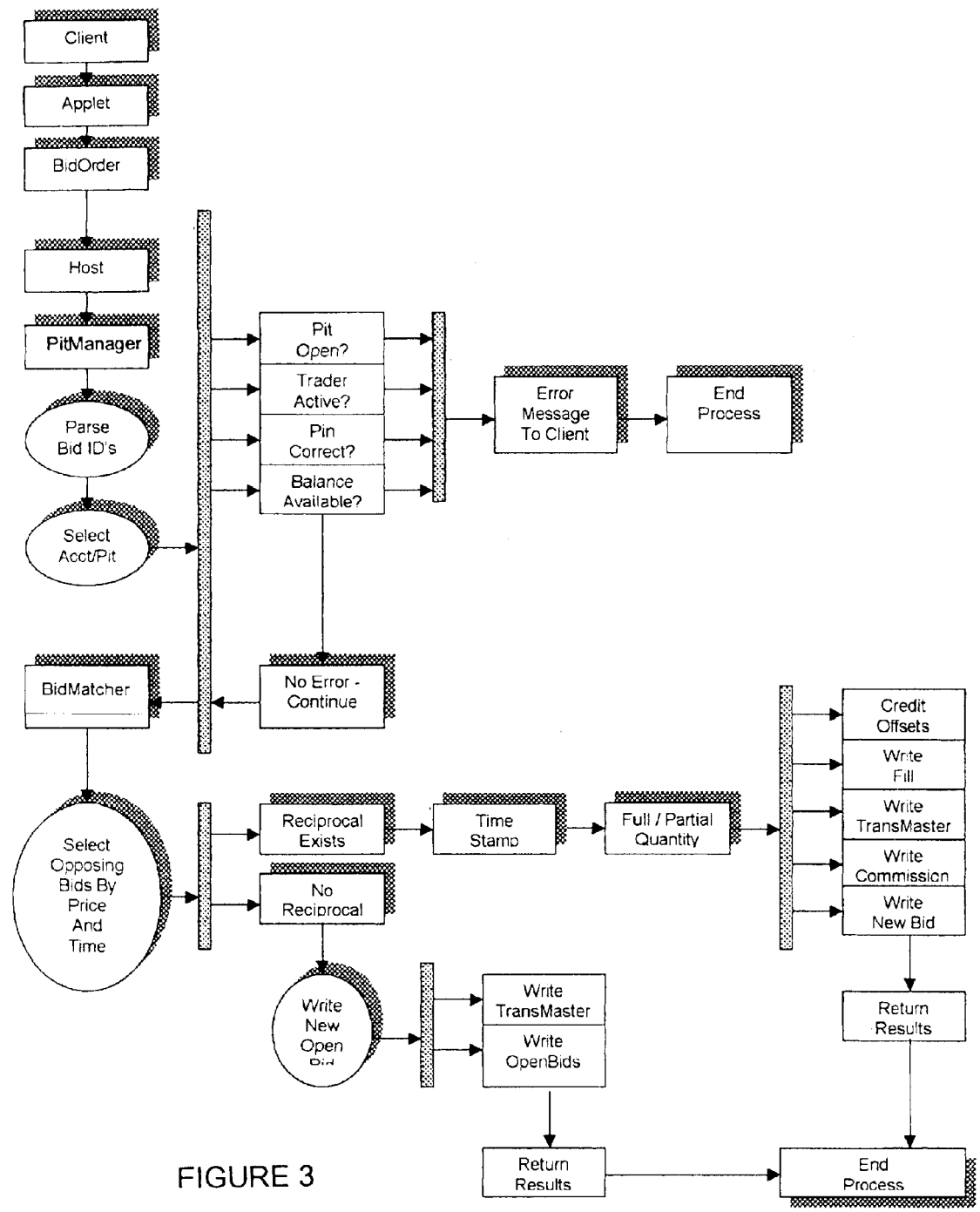
FIG. 3 is a simplified diagram of the bid order processing employed in the preferred computerized embodiment of the invention.

It will be readily apparent to persons of skill in the computer arts that computerized embodiments of the invention, as it has been previously described herein, may readily be designed and implemented using known techniques for database management, computer network management, and graphical user interface design. The computerized embodiment that represents the best mode of practicing the invention presently known to the Applicant is generally illustrated in FIGS. 1–3 and described in detail below. Referring to FIG. 1, a computer network 10 includes a Host computer 12, connected for scaling purposes, to sub-Hosts 12a to 12c, all of which Host computers are operatively connected to one or a plurality of database servers 14 serving pit data database 16 and other databases useful to the operation of the system. Host computer 12 and the sub-Hosts are also connected via appropriate routers and modems (not illustrated) to a data communications network 18 such as the Internet. A plurality of trader client terminals 20 such as conventional personal computers are connected to network 18 for communication with Host computer 12.

Each client terminal 20 comprises means for the communication and display of data in graphical formats, preferably including a World Wide Web browser such as Microsoft Explorer or Netscape Navigator, and it also comprises data storage, display, communications and input/output devices of the kind with which personal computers are ordinarily equipped, together with appropriate software means for operating such devices and for accessing, inputting, generating, manipulating, displaying andlor transmitting data including data in graphical formats.

Host computer 12 and database servers 14 comprise conventional means for the receipt, registration, and manipulation of data and the maintenance of dynamically variable databases containing data regarding trader identification, trader financial accounts, and received bids (including a plurality of fields for the registration of bid attributes including for each bid without limitation Trader ID, Pit ID, "side" selection, price, quantity, status (as Open, Cancelled or Filled), and time-stamp data).

Upon logon to a system according to the present invention the subscribing trader is queried by the Host computer to provide an identifying ID and a password, as previously established or newly selected. Once the trader ID and password have been received, and authenticated by the Host as identifying a subscribing member of the trading system, the Host transmits for display on the trader's monitor the trader's personal account information obtained from database 16 and a list of available trading pits; personal ID information uniquely associated with that member is also included in this transmission from the Host, for incorporation into the browser software of the trader's whereby the Host may identify subsequent communications from said terminal automatically. At this point a screen displaying the trader's personal account information is displayed on the trader's monitor, together with selection buttons allowing the trader to select among a choice of available trading pits. In each trading pit, trading is conducted with respect to a contract concerning a single commodity, event or opinion, and such trading employs as the trading instrument a fixed face value contract having two opposing and mutually exclusive "sides," as previously described.

Upon the selection of a trading pit by the trader, the trader's client terminal opens a new thread with the trader's computer, via a new TCPIIP connection, and transmits a Pit Request 101 to the Host. On receipt of this transmission by the Host computer, the Host proceeds to compile the client software needed by the subscriber to engage in trading on the system. (As shown in FIG. 1, In a system comprising sub-Hosts a Distributor process at the Host may alternatively assign the connection from the trader's remote computer to a sub-Host 12c for handling). This client software is compiled by the Host in the form of applet 103 that comprises the trading system application, and that also incorporates the latest trade data pertinent to the trading pit and contract selected by the trader (including the latest contract price, graphically presented price tick data, and lists of the top open bids on each side the contract). The Host computer then initiates a TCP/IP transmission of this applet to the trader's terminal.

Once the entire applet 103 has been received, i.e., downloaded, by trader's "client" terminal 20, said client terminal automatically and in a conventional manner launches the trading system application in said applet, and draws on the trader's display the trading pit selected by the trader. The client software applet comprises means for accepting user input, means for verifying and authenticating user input, and means for transmitting that user input to the Host computer, enabling the user engage in trading activities. Said client software also comprises means for receiving and displaying on the user's screen dynamic updates of various screen components, including for example fresh information regarding contract prices and volume as transmitted to the client by the Host, acknowledgments by the Host of user inputs, and updates by the Host of the trader's account information and trading positions in response to said trader's inputs. Trading Information updates may be transmitted to a trader's terminal upon the Host being automatically queried therefor at preset intervals by the client software at the trader's terminal. (In the alternative, the system may readily be designed to maintain a persistent communication thread between the Host and each participating trader, and in such a system the Host may broadcast updated trading information automatically to all connected traders at periodic, preset intervals.)

FIG. 2 illustrates a typical trading pit screen 22 and its components. The trading pit screen displays the current data available in the system regarding the particular contract being traded in that pit, and Includes selection buttons for the initiation of bid orders and the accessing of specified data. The contract may concern a sports event such as a professional basketball match to be televised nationally the same evening as trading continues, a stock index, or a matter of a opinion regarding a political event to be decided on a date certain, such as a presidential election, in the U.S. or in any country. in each instance the contract will be presented for bidding in the form of a two-sided proposition, e.g., the Blues will beat the Reds, or Smith will outvote Jones, and in each instance, bids will be placed only on units of the contract that have been assigned a preset value, say $100, payable to the holder of a winning contract upon its determination, which may be the conclusion of the sporting event, an election, the occurrence of a specified event by a future date, or any other agreed-upon determinant of the proposition posed in the contract under bid.

Referring to FIG. 2, pit screen 22 includes a block 26 graphically displaying tick data representing in time-stamp order the most current trades made in the pit, boxes 28 listing the top open bids for each side of the contract, and a Bid Order selection button 24 for each side of the contract. The pit screen also includes a group of selection buttons whereby the trader may access lists of pertinent trading information, including a "My position in this pit" button 32, a "My filled contracts" button 34, a "My cancelled bids" button 36, and a "My general account" button 38. Lastly, a "Cancel my open bids" selection button 40 opens a dialog box containing a listing of that trader's active bids, and also containing entry boxes enabling the trader to select active bids to be cancelled, and to submit an order to the Host canceling the bids thus selected (and also automatically effecting a release of the funds that were reserved or withdrawn from said trader's account when the now-cancelled bids were initially submitted).

Traders may bid on either side of the contract at issue, until its determination by the course of events. Thus traders may bid on the outcome of a televised basketball match during the match as well as before, right to the moment of its conclusion. It may be expected, for example in trading on an ongoing sports event, that the prices bid for either side of the contract may vary rapidly and greatly in the course of the game itself, as the fortunes of the contending teams shift back and forth; likewise, the pace at which bids are submitted (and open bids are cancelled) will generally vary rapidly in the course of such an event. As bids and trades are made the display screen of each participating trader is continually updated at preset intervals with fresh trading data, transmitted to the trader's terminal by the Host, enabling each trader to make further trading decisions based on up to the minute information regarding current contract prices and trade volume.

Upon deciding on a trading strategy, the trader viewing trading pit screen 22 chooses the intended side of the contract (e.g., Blues win or Reds win) and selects Bid Order button 24. Upon the making of this selection a dialog window is opened by the graphical user interface, containing blanks for the entry of lot size and price choices by the trader, via the keyboard (or other suitable input device) at the trader's terminal. The trader enters lot size and price choices, and then selects a Bid Order button also displayed on this dialog window, which causes the client software to accept and store the traders choices. Consistent with the principle that the individual trader is to have exclusive control over all trading activities in the pit a second dialog box is then opened in this preferred embodiment of the invention, requiring confirmation of the bid order by the trader prior to its transmission to the Host. This second dialog box displays the trader's lot size and price selections, and requests the trader to verify the bid order by entry of his/her Pin number and the selection of a confirmation button.

Upon the confirmation of the order instructions by the trader, and selection of the confirm button, the transaction data is compiled by the applet, including a pit identifier (if the Host is managing a plurality of pits) and the trader's ID identifier, and the data thus compiled is transmitted to the Host computer, preferably using encryption means such as SSL, via TCP/IP or other suitable telecommunications means. The trader's terminal then waits for the trader's order to be processed at the Host computer, following which confirmation of the actions taken by the Host computer, and a detailed report of said actions, will be passed back by the Host to the still open window maintained by the client software on the traders client terminal 20.

FIG. 3 illustrates generally the steps carried out by Host computer 12 on receipt of a bid order from a client terminal 20. On receipt at the Host computer the bid order is passed to a Pit Manager Process and the bid order is parsed for Pit ID, transaction type and trader Pin number. The "side" of the contract selected by the user is identified, say as "Home" side bid in the "Home" and "Away" side categorizations that might be used in the case of a sports event, and authentication processes are initiated. A security process in the Pit Manager verifies in a Trader Account Table the account ID and the Pin number submitted by the client terminal of the trader, and then checks the trader's account balance in the Trader Account Table. The Pit Manager temporarily locks the trader's account, reserves or withdraws the funds needed to complete the trade requested by the trader, and passes the bid order to a Bid Matcher process. If any of the above-described verification and authentication steps fails, however, the Pit Manager immediately notifies the client terminal via the open thread, causing the results to be displayed on the client terminal display, and the Pit Manager rolls back to their original state all database tables and accounts.

Once the verification and authentication steps have been satisfactorily completed, the Bid Matcher process initiates the process of searching existing bid records in a Bids Table for any reciprocal matching bids, that is, any opposing bids that have an "open" status (O), and that have a price, relative to the fixed value of the contract, which is at least the reciprocal of the price specified in the newly submitted bid. As stated above, the Bids Table is a database comprising a comprehensive, dynamically updated listing of all bids received in the system, including for each bid an entry for each pertinent bid attribute, including pit ID, selected side, price, quantity, time-stamp, trader ID and bid ID, and bid status as Open, Cancelled, or Filled. (Alternatively, of course, the database management of the bid data and other data employed by the system of the present invention can be handled in a variety of ways, well known to persons of skill in the art; the use of separate databases for each pit, or indeed for each "side" of each pit, would be two such examples among many). If no such opposing, matching bids are found, the Bid Matcher Process creates a new record to the Bids Table for the newly submitted bid, assigning a time-stamp and an "open" status (O) identifier to said record. This newly submitted bid order thereby becomes a "resting bid" that is available to be matched, according to side, price and time-stamp, by any subsequently received bid orders that come into the system. The Pit Manager Process at this point returns an Open Bid confirmation to the client terminal, causing a screen to be displayed at said terminal that contains confirmation that the system Host has entered the submitted bid order, and that also confirms the values specified by the trader for price and lot size. Where no matching bid was immediately found these actions complete the bid process for that bid order, and the trader's client terminal screen is "returned" to the user, the trader, and it displays the trading pit screen.

If the Bid Matcher Process, in searching the Bids Table for a match to a newly received "Home" bid order, does locate one or more reciprocal "Away" matching bids, it selects the matching "Away" bid record with the earliest time-stamp. The Bid Matcher then locks that matching "Away" bid record, and it compares the bid orders in database memory, parsing the two orders to determine if they specify the same or a different lot size. If the number of contracts specified in each of the matching bids is the same, the Bid Matcher updates the status identifier of the existing (resting) record (here assumed to be an "Away" bid) from (O) for "open" to (F) for "filled"; the Bid Matcher at this point also assigns a new time-stamp to each of the matching bid orders, and enters in their respective records additional variables regarding said bid orders and their respective bid IDs. If however the lot sizes specified in the matching bids differ, the Bid Matcher first calculates the difference in lot sizes, and it matches the newly received bid (a "Home" side bid in our example) with the available lot number of contracts specified in the first "resting" bid order, the Bid Matcher then performs a loop process, repeating the process just described with the opposing matching bid having the next earliest time-stamp. If no other matching bid are found, the Bid Matcher records a "partial fill", as follows: It updates the original record of the newly received bid to record the "filled" contracts, and it adds a new record in the Bid Table to record the remaining, unfilled contracts and maintain for said new record the time-stamp originally assigned on receipt of the bid order. Once these processes have been completed, the Bid Matcher sends confirmation thereof to the client terminal via the open thread, and thereby instructs the Graphical User Interface to draw the results of the transaction on the trader's display. This confirmation results in a screen display that sets forth the number of contracts filled, the price, and the number of contracts remaining as open in the Bids Table (if any). The connection is then dropped between the client terminal and the Host, and the client terminal screen is returned to its user, the trader, and again displays the trading pit screen.

Whenever a match has been made by the Bid Matcher Process, as described above, the Pit Manager causes an Accounting Process software module then to initiate the accounting and clearing processes associated with the transaction. As stated earlier, when the original bid order was submitted by the client terminal, the Bid Matcher reserved or withdrew from the trader's account the funds that would be needed to finalize a trade based on said bid order. The Accounting Process now acts to complete the transaction and to credit and debit, as appropriate, the respective account balances of the traders who are parties to the transaction. Beginning with the resting open bid portion (Bid1) of the transaction (in the example above, the resting "Away" bid), the Accounting Process first determines whether any portion of the new "fill" offsets an existing position in that trader's account. That is, does that trader have any filled contracts on the "side" of the contract opposite the side to which the newly filled contracts pertain? To make this determination the Account Process first determines the trader's overall position, by counting the total number of filled contracts, on each side of the particular trading pit, that are associated with that traders ID, as set forth in the records in the Bids Table. By computing the total number of filled contracts on both sides for that trader, the Accounting Process determines if the number of filled contracts on both sides of the contract is equal. If so, the trader's account is then debited in the amount previously reserved for the current order, less the amount allocable to any unfilled contracts then remaining.

On the other hand, if the trader's overall position at this point is not neutral (that is, the trader's position is still "long" on one side or the other of the contract), the Pit Manager determines whether the long position shown is offset by the position (i.e., "side") and the number of contracts of the new fill. If the new fill does not offset the trader's preexisting long position in any respect the Bid Matcher follows the rule stated directly above. If, however, the trader has a long position that is offset, in any respect, by the new "fill", the number of new contracts filled is subtracted from the long position (i.e., from the net number of contracts by which the trader's position is "long"), and the trader's account record is accordingly updated: The trader's account balance is credited by multiplying the predetermined contract value (i.e., its fixed value, say $100 per contract in the examples used above) by the number of offsetting, filled contracts, less the commission associated with said filled contracts. This completes the clearing process for the resting bid side (Bid1) of the transaction. The Accounting Process software then proceeds to repeat each of the steps described above for the later submitted bid order (Bid2), referred to above as the "newly received bid order", and it updates its corresponding account information records through the same processes. Any imbalance in either traders position is carried until it is subsequently offset through additional trading activities or upon final settlement at the end of the trading event. The steps set forth above are undertaken for all bid orders that enter the system.

The Host computer preferably comprises a software module that is capable of processing data from trading activity in the system to provide past and current market and contract history, possible future direction via technical analysis, contract volume and open interest, plus market concentration and velocity. At regular preset intervals the client software of each online trader transmits a request to the Host computer for a return transmission of updated contract information, to provide the trader with current trading information including a listing of open bids with their prices and lot numbers and more generally to assist the trader in gauging current trends and predicting future market direction. Said transmitted trading information may also include for example trading volume data that enables the receiving trader to gauge market depth and concentration.

In addition to automatically generated, set interval updates of trading information as described above, subscribing traders may also submit dynamic queries to the Host to request contract specific information including historical information regarding bid prices, timing and volume. The Host computer dynamically compiles requested information in response to trader queries and transmits that information to the requesting trader only for display on that traders monitor. Since up to the minute data is always being dynamically added to the Host's trading database, the information from which responses to trader inquiries are compiled is always current.

It will be apparent to persons of skill in the computer arts that the trading system of the present invention may readily be designed to incorporate redundancy capabilities and related features that will Insure uninterrupted operation, such as redundant software, database rollback methods, distributed processing and other methods presently known in the art or subsequently developed. As traders are added to the existing trading pits, additional processors may readily be added dynamically and automatically, as conditions warrant, to handle the increased load in an efficient manner, and other enhancements including high bandwidth communications channels may be employed to scale the system to handle virtually limitless trading pits.

The Host computer should comprise software processes, generally known to persons skilled in the art and for that reason not further described here, that serve to implement the data integrity and security functions of the system. These processes handle access to the system, authentication and verification of trader inputs, the security of any threads that link the Host to connected traders, system integrity and rollback ability. Conventional authentication routines and processes are to be used at many levels, enabling the system to operate securely, accurately and error-free. In particular security processes are necessary to insure that each trader's account is unique, guarded, and accessible only to that trader. Security processes also handle deposits and withdrawals of funds from trader accounts, in conjunction with third party secure operations including third party credit card verification, authentication and fulfillment servers.

All transaction data and action requests received by the Host computer from any trader, and all data generated by the Host regarding a trader's input data, are associated by the Host with the trader's ID identifier, and this unique identifier accompanies all subsequent actions taken by the Host processes regarding such data. In the course of a trading session high level authentication "cookies" residing in the client's HTTP browser and transmitted to the Host HTTP server may also serve to maintain security. Using this system of identification and security, all Host generated software processes may reliably identify data inputs that are received by the Host as having been generated by a particular system subscriber. Furthermore, a complete accounting of each trader's orders and other activity, associated with that trader's unique identifying ID, may be tracked, recorded and thereafter maintained by software processes, making the verification of every order possible at each step in the trading process.

Through encryption protocols and encryption software such as SSH and SSL technology, and the use of multiple trader verification steps by the Host computer, identity and security may be assured as trade orders are transmitted and received between the Host computer and the subscribing trader. In addition the use of such security processes and unique trader identifiers assures each trader of anonymity, since all trading activity is carried out using ID identifiers known only to the system Host computer and the pertinent trader.

At the discretion of the trading system operator the system of the invention may be designed to allow any trader to develop new contracts and trading pits on specific events, conforming to the specifications described above with respect to the form of the contract, and to open new trading pits for trades concerning said specific events. Individuals holding strong views on a current event, for example a political election, a notorious criminal trial, or the quality of that year's Bordeaux wine, may be provided the opportunity to "put their money where their mouth is", and to create a market for trades in contracts regarding such subject matters. The structure of the system of the invention allows the creation of such new trading pits, and the publication of their existence, nature and terms, on a global basis, effectively at will.

It is furthermore a simple matter to modify the user identification entry screen to include fields, optional at the discretion of the system administrator and/or of the subscriber, containing additional data entry fields for example identifying the gender of the user, age group, educational level, language proficiency, and any number of other parameters, and to program the system to enable a user desiring to design and open a new trading pit to select the audience to which the availability of the new trading pit is to be broadcast. In this fashion a trader located in the United States could be provided the discretion to create a trading pit, for example, and to specify that access to that trading pit shall be limited to traders located in a specific state or states, or in specified countries. The inherent flexibility of the system of the invention enables it to be tailored precisely to meet the desires of the system administrator and of system subscribers, in consideration of commercial interests, regulatory requirements, or simple whim.

Still more generally, it will be readily apparent to the person of skill in the art that the system of the present invention has a wide if not limitless range of applications beyond the field of classic contracts trading. The system of the invention is thus readily usable to develop opinion polling systems having a capability for both instantaneous and continuous determinations of voter opinions, and to do so with a powerful ability to generate opinion data having strong associations with intensity and depth of emotion regarding any issue. Opinion polling systems according to the inventions may take many forms, including use in polls directed to a preset pool of citizens on an ongoing basis, or spontaneous polls launched on any given day regarding any given issue of public interest, whether local, regional, national or global. In this application also the system may readily be designed incorporate means for separately identifying interest groups, to allow tailoring the broadcast of polling information to selected polling samples, and thereby enhancing the informational content of the resulting opinion trading activity for use in research activities.

The capability of the present invention to enable extremely rapid, informed contract trading with respect to rapidly changing market conditions makes the present invention particularly suitable for a variety of entertainment activities in which players exercise their trading skills In the course of live events such as sporting events. These potential applications would thus range from trading system substantially as described above, but adapted for closed venues such as lounges, casinos, private clubs and cruise ships, to home entertainment systems in the nature of parlor games.

For parlor game applications, the trading system software may be embodied on a game cartridge, a CD-Rom, or any other storage medium suitable for retail distribution, or downloadable for a fee from an internet site. The system may for such applications readily be adapted to display all trading information on a single display, including a television monitor, and to employ as a user input device any conventional data input device including conventional or custom keyboards and mice, joysticks, voice command recognition devices, or the like. In a parlor game application players would be provided with preset account, and would compete to maximize their respective accounts.

The susceptibility of sporting events to wide swings of opinion, on a minute by minute basis, as the fortunes of the game favor first one team and then another, and back again, makes such events natural objects for the trading of contracts in accordance with the present invention. However these applications of the present invention may be further extended to make possible trading markets in virtual games, generated for example by computer software employing random event generators to create programmed uncertainties akin to those of real events.

Lastly it will be apparent to persons of skill in the pertinent arts that particular embodiments of the system of the present invention may make particularly fruitful use of ongoing developments in computer and telecommunications technologies. A trivial example is the advent of voice recognition systems, which may replace physical data entry devices for many users (notably including disabled users), together with audio systems in lieu of or in addition to visual displays. Current and future advances in telecommunications technology may also be fruitfully employed to enhance the performance and utility of trading systems according to the invention. For example the use of space satellites to relay data between Host and remote client terminals may be employed both for publicly available trading systems and for "closed" subscriber systems including multi-location casino or resort systems.

Lastly, there are currently being deployed several telecommunications systems that rely on space satellites to relay data communications signals notably across continents, and that for example employ opto-electronic means, i.e. lasers, as fast broad-band communications channels. The global operation of trading systems according to the present invention requires reliable, fast broadband communications channels, notably for the broadcast of updated trading information to all connected traders; this function may be enhanced in such a global system by locating the functions of the Host computer in the operation of the system on a space satellite, linked to system traders directly or through relay stations and channels, thereby reducing the length of the communications path to be traveled by trading data requiring intercontinental transmission.

While the invention has been described in connection with specific embodiments thereof, it will be understood that it is capable of further modifications. This application is intended to cover any variations (e.g., the use or development of other options to serve wider numbers of concurrent users, variations in "push/pull" means of disseminating information from a central computer to client terminals, variations in database management means, and the use of audio or video messaging means), uses or adaptations of the invention following, in general, the principles of the invention, and including such departures from the present disclosure as come within known and customary practice within the arts to which the invention pertains.

We claim:

1. A trader-controlled trading system for implementation on a computer network, said trading system comprising:
    (a) a computer network comprising a host computer having access to database means for recording attributes of bids placed by traders, a plurality of remote terminals, and network means allowing bi-directional communications between the host computer and each of said remote terminals;
    (b) a trading instrument concerning a stated subject matter, each unit of said trading instrument having a fixed face value and further having two opposing sides that respectively represent mutually exclusive outcomes regarding a subject matter of said trading instrument;
    (c) software means for enabling traders as users of said remote terminals to view attributes of said trading instrument and to place, with said host computer, bids to purchase at least one unit of a specified side of said trading instrument, and further providing for each mid bid placed by a trader to specify a selected one of said two sides, to specify a bid price per trading instrument unit that is less than a fixed face value, and to specify a selected quantity of trading instrument units; and
    (d) software bid matching means for declaring a matched trade between a first bid placed to purchase at least one unit of one side of said trading instrument and a second bid placed to purchase at least one unit of the opposing side of said trading instrument where a sum of the prices per unit specified in said first and second bids are in an aggregate at least equal to a face value of said trading instrument.

2. The trading system of claim 1 wherein said host computer comprises means for establishing accounts for users of said remote terminals in which accounts said users may deposit funds from their remote terminals, and said host computer further comprises means for automatically reserving or withdrawing from the said account of any said user the value of any bid submitted by said user to the host computer.

3. The trading system of claim 2 wherein the account of any user whose trades have resulted in a net gain is automatically credited by the host computer with an amount of said net gain.

4. The trading system of claim 2 wherein the host computer comprises means for immediately clearing and settling any matched trades.

5. The trading system of claim 2 wherein selected of said bid attributes maintained on a list of bids is accessible to all users of sold remote computers on an equal basis.

6. The trading system of claim 1 wherein the host computer comprises means for assigning a time-stamp to each bid on receipt of said bid, and the host computer in declaring a matched trade preferentially selects a matching bid having an earliest time-stamp.

7. A trader-controlled trading system comprising for each trading event:
    a) a single trading instrument having a fixed face value and two opposing sides representing mutually exclusive outcomes,
    b) means for traders to submit bids to purchase, at a price per trading instrument unit that is always less than said fixed face value, at least one unit of either side of said trading instrument,
    c) means for comparing bids submitted to the trading system, d) means for declaring a matched trade when a first bid submitted on one of said sides specifies a purchase price that, added to the purchase price specified in a second bid submitted on the opposing side, at least equals said face value, and e) means for determining that one of said two sides of the trading instrument is a prevailing side.

8. A trading system according to claim 7 wherein said fixed face value is payable to a holder of each trading instrument unit specifying said prevailing side.

9. A trading system according to claim 7 that further comprises means for associating a receipt time-stamp with each bid received in the system, and wherein said means for declaring a matched trade comprises means for preferentially matching, among bids on the same side that specify the same purchase price, the bid having the earlier timestamp.

10. A computer-implemented trader-controlled trading method that employs for each trading event a single trading instrument having a fixed face value and two opposing sides that represent mutually exclusive outcomes, said method comprising the following steps performed by said computer:

a) soliciting bids to purchase, at prices per trading instrument less than said face value, units of either side of said trading instrument, b) receiving at least one bid to purchase a unit of one side of said trading instrument at an offered purchase price less tan said face value, and receiving at least one bid to purchase a unit of the opposing side of said trading instrument also at an offered purchase price less than said face value;

c) comparing bids received, and d) declaring a matched trade when the offered purchase price of a first bid specifying one of said sides, added to the offered purchase price of a second bid specifying the opposing side, at least equals said face value.

11. The trading method of claim 10 further comprising the stop of determining that a side of the trading instrument is a prevailing side.

12. The trading method of claim 11 further comprising the step of paying said face value to holders of each trading instrument unit that specifies said prevailing side.

13. A trader-controlled trading method conducted over a telecommunications network comprising a host computer, a plurality of remote terminals, and telecommunications means connecting said host computer and said remote terminals and enabling a transmission of data to and from said host computer and each of said remote terminals, said method comprising the following steps for each trading event:

a) the dissemination by the host computer to said remote terminals, for bidding thereon by users of said remote terminals, of a single trading instrument having a fixed face value and two opposing sides representing mutually exclusive outcomes regarding a subject matter of said trading instrument, b) receiving in said host computer a plurality of bids entered from said remote terminals, each of said bids specifying a selected one of said two sides of a trading instrument and also specfying a purchase price per unit of said trading instrument for a purchase of at least one unit of said trading instrument, c) said host computer declaring a matched trade upon receiving a first bid specifying one side of said trading instrument and a second bid specifying the opposing side of said instrument, where a purchase price set forth in said first bid and a purchase price set forth in said second bid are each less in amount than said face value and a sum of the purchase prices per unit specified in said first bid and said second bid at equals said face value.

14. The method of claim 13 wherein said trading instrument concerns an event having a termination point pursuant to pre-established criteria whereupon a side of said trading instrument will determinably be a prevailing side and the opposing side will determinably be a losing side.

15. The method of claim 14 comprising a further step requiring each user of said remote terminals, prior to entering any bid to said host computer, to establish an account and deposit funds in said account.

16. The method of claim 15 comprising the further step that upon receipt by the host computer of any bid from a remote terminal, funds sufficient to cover said bid are withdrawn from the account established by the user entering said bid.

17. The method of claim 16 comprising the further steps that, at any point prior to the termination of said event the account of any of said users who then holds an equal number of trading instruments on each of is two opposing sides may automatically be credited by the said face value multiplied by said equal number of trading instruments, and automatically debited by an aggregate amount bid by said user to purchase all of said trading instruments, less any amounts previously withdrawn or reserved from said account with respect to said trading instruments.

18. The method of claim 14 comprising the further step, upon the termination of said event, of paying holders of trading instruments specifying the side determined to be the prevailing side en amount equal to said face value for each unit of such trading instruments.

19. The method of claim 18 wherein said payment is made automatically by the host computer to the account of each of said holders of trading instrument specifying the side determined to be the prevailing side.

20. The method of claim 13 comprising the further step that each bid received by the host computer is assigned a time-stamp upon receipt by the host computer.

21. The method of claim 20 comprising the further step that the host computer maintains a current list of all active bids received by the host computer regarding said trading instrument, including the side, price and quantity of trading instrument units specified in each bid on said list, and also including a receipt time-stamp.

22. The method of claim 21 comprising the further step that, in an event the host computer determines that a newly received bid may be matched with more than one earlier-received opposing bid, the host computer effects a matched trade first with an opposing bid having an earliest time-stamp.

23. A computerized system for trading in a single market units of a fixed value trading instrument having two complementary sides, comprising:

a) means for receiving and storing bids received from remote trader terminals to purchase at least one unit of one side of said trading instrument each of said bids comprising a purchase price term and a unit quantity term, b) means for receiving and storing bids received to purchase at least one unit of an opposing side of the trading instrument from remote trader terminals, each of said bids comprising a purchase price term and a unit quantity term, c) means for coupling bids received on one side of the trading instrument with said stored bids received on the opposing side of said trading instrument for comparing the purchase price and quantity terms of opposing bids, and d) means for executing a binding trade when a match exists between at least one bid received on one side of said trading instrument and at least one stored bid received on the opposing side of said trading instrument, and e) means for clearing and settling each said binding trade.

24. A computer-implemented method of automatically and equitably effectuating trades of a fixed value trading instrument having two opposing sides between subscribers in a computerized trading system wherein a host computer is coupled to a plurality of individual trader terminals, said method comprising the following steps performed by said computer:

a) booking on a first bid list, in a priority sequence according to a predetermined program, unfilled bids including associated purchase price and lot quantity parameters received on one side of the trading instrument, b) booking on a second bid list, in said priorily sequence according to said predetermined program, unfilled bids including associated purchase price and lot quantity parameters received on the other side of the trading instrument;

c) comparing in said priority sequence the purchase price and lot quantity parameters of each of said unfilled bids booked on said first bid list with the purchase price and lot quantity parameters of sald unfilled bids on said second bid list, d) transacting said received bid on said first bid list with a highest priority bid or bids on a complementary list if said bid can be matched against one or more bid orders on a complimentary bid order list, and e) placing an untransacted portion of said incoming bid order on a corresponding one of said list in a priority sequence according to the corresponding one of said predetermined programs if said incoming bid order cannot be completely matched against any bid order or orders on said complementary bid order list.

25. A method according to claim 24 further comprising the step that incoming bids are time-stamped on receipt by the Host.

26. A method according to claim 25 wherein bids are booked in a priority sequence in order of time-stamp receipt.

* * * * *